ABSTRACT OF THE DISCLOSURE

The use of activated carbon in removing small quantities of sulfur compounds has gained wide acceptance as a pretreatment stage in hydrocarbon streams used in such processes as steam gas reforming. Capacity of activated carbon or metal oxide carbon is increased by the use of water.

---

BACKGROUND OF THE INVENTION

It has long been the practice to remove sulfur compounds by means of activated carbon from natural and manufactured gases, ammonia, hydrogen and from LPG and various hydrocarbon gases, prior to using such streams in chemical reactions. In addition the commercial acceptance of steam-hydrocarbon reforming for high purity hydrogen production focused attention on the need for removing sulfur from a natural gas feed stream.

The use of activated carbon for removing small quantities of sulfur or sulfur compounds from a natural gas stream began to be practiced in the late 1940's. The introduction of chemically treated activated carbons in the 1950's improved the effectiveness of the carbon, and enabled this method of desulfurization to gain wide acceptance.

Today the use of activated carbon as a pretreatment process to remove trace quantities of sulfur from natural gas and LPG gas streams is wide spread. Both activated carbon and activated carbon which has been treated or combined with various metal oxides are used. Metal oxides in combination with carbon appear to produce a synergistic effect which greatly improves the capacity of the activated carbons for the adsorption of sulfur compounds. Such metals as copper, iron, manganese, nickel, cobalt, cadmium, zinc, and the like are used in amounts of 3, to, say, 15 percent by weight based on the carbon, the carbon usually being impregnated with a solution of a metal salt which can be heat decomposed to the oxide. Activated carbon and activated carbon modified with various metal oxides are an expedient and economical means of desulfurization. They are primarily used to remove mercaptans, disulfides, thioethers, thiophens and hydrogen sulfide present in gas streams in amounts less than three volume percent, normally amounts of 10 p.p.m. to 0.5 percent. Activated carbon is well known, and has had many uses because of its high adsorption capacity, usually being characterized by a high surface area, say above 500 and generally above 1000 square meters per gram.

In operation the carbon is placed in fairly large diameter vessels or drums, two drums normally being used in parallel so that one can put on stream while the other one is being regenerated. Most uses of the drums are based on five days on stream, followed by a one day regeneration. In desulfurizing applications the carbon drums operate at ambient temperatures, i.e., 32° F. to 150° F., and at the pressure employed in the plant, which is controlled by other processing requirements, generally a pressure between 10 and 1000 p.s.i.g., and a space velocity of 500 to 6000 volumes of gas per volume of carbon.

SUMMARY OF INVENTION

Heretofore when steam has been used to purge the adsorbent vessel prior to operation, or during regeneration, it has been the practice to follow the steam by a treatment eliminating steam from the adsorbent. This invention, however, is based on the discovery that the capacity of activated carbon or metal oxide modified activated carbon adsorbents is increased by an unexpected factor if an optimum amount of water is permitted to remain on the adsorbent during the desulfurization. Thus, the capacity to adsorb the sulfur compound is at least doubled by the practice of the invention, and under certain conditions a fourfold or fivefold increase in sulfur adsorption capacity is achieved.

DETAILED DESCRIPTION OF THE INVENTION

In its preferred embodiment this invention contemplates incorporating water in the catalyst as a result of steam regeneration. However it is also possible to bring the adsorbent to its water content by steam purge or by the presence of water vapor in a process gas purge at any stage prior to putting the adsorbent on stream.

The effect of bringing the carbon adsorbent to a selected water content prior to its use in desulfurization is best illustrated by the following examples. These examples are, of course, illustrative only since various methods of introducing water will occur to those skilled in the art.

In these examples one hundred fifty liters per hour of a natural gas stream containing 3.3 p.p.m. $H_2S$, 0.5 p.p.m. RSH, 0.3 p.p.m. RSR and 0.8 p.p.m. residual sulfur believed to be COS and RSSR, was passed through a 50 cubic centimeter catalyst bed. The adsorbent capacity was rated as liters of gas per liter of adsorbent which it passes through without any sulfur leakage, in other words without any sulfur passing through as determined by a coulombmetric sulfur analyzer. The gas was a natural gas stream containing about 5 p.p.m. mercaptan, and was passed through the adsorbent at a temperature in the range of 35° F. to 85° F. The following data was obtained by variations in regeneration procedures using a zinc oxide modified activated carbon adsorbent.

As the examples will show, it has been found that too much water is detrimental to the adsorbent. Accordingly, there is an optimum amount which should be present. Usually the adsorbent should contain at least three percent water based on its own weight and generally not over sixty percent. Preferably more water will be used in the case of activated carbon which is not modified. Thus in the case of metal oxide modified activated carbons desirably the water content will be in the lower half of the range, whereas in the case of activated carbon which is not modified with a metal oxide, the water content best will be in the upper half of the range.

Example 1

An adsorbent saturated with sulfur compounds to capacity during use was regenerated with steam at a temperature of 500 to 750° F. until the quantity of sulfur present was negligible. The adsorbent was then purged with recycled natural gas until it cooled to ambient temperature, the recycle gas driving the steam out of the adsorbent at the high initial purging temperatures by the time the system cooled down.

Example 2

An adsorbent saturated as in Example 1 was regenerated with steam at a temperature of 465° F. maintaining steam flow until the temperature of the adsorbent reached the steam temperature and sulfur was gone. The unit was then shut down under pressure and permitted to stand until it cooled to ambient temperature. Subsequent purging with recycle gas showed the adsorbent to be saturated with water.

Example 3

An adsorbent was regenerated as in Example 1 with 470° F. steam until the temperatures were equalized and the sulfur gone. The steam was then depressured, lower temperature steam being gradually introduced until the temperature of the system reached 200° F. When the temperature reached 200° F. the unit was shut down and permitted to cool further to the ambient temperature.

In the following table are set forth adsorption capacities of the adsorbents treated in accordance with the foregoing examples.

Table 1

| Regeneration method: | Capacity (liters of gas per liter of adsorbent) |
|---|---|
| Example 1—No water vapor present | 44,520 |
| Example 2—Saturated with water | 50,040 |
| Example 3—Contained optimum amount of water | 280,000 |

As can be seen from Table 1 the presence of water vapor increases the capacity of the adsorbent an unexpected sixfold. The data also show that if no water, or too much water is present the adsorption capacities are about equal. The adsorbent capacity is not significantly improved if too much water is persent.

In the following examples recycled natural gas was used to flush the unit in order to cool it with the flushing gas more rapidly than it would if merely shut down to cool on standing, the process being more adaptable to commercial operation.

Example 4

As in Example 1 the adsorbent was regenerated with steam at 460° F. After regeneration steam was depressured to bring the system temperature to 250° F. The unit was then cooled to ambient temperature with recycle gas.

Example 5

The adsorbent of Example 4 was subsequently regenerated at 290° F. with steam and then cooled as set forth in Example 4.

Example 6

When the adsorbent employed in Example 5 had again reached its capacity of sulfur adsorption, it was again regenerated as in Example 5, the temperature being 270° F.

Example 7

The adsorbent employed in Example 6 was regenerated at 295° F. when it had again reached its sulfur capacity. The regeneration procedure being the same as that employed in Example 5.

In Table 2 are given adsorption capacity values wherein the adsorbent was cooled with a process gas rather than being permitted to cool on standing. The table also shows the effect of subsequent regenerations of the same adsorbent.

Table 2

| Regeneration method: | Capacity gas liters liter of adsorbent |
|---|---|
| Example 4—1st regeneration | 94,490 |
| Example 5—2nd regeneration | 129,780 |
| Example 6—3rd regeneration | 185,700 |
| Example 7—4th regeneration | 281,460 |

As can be seen from Table 2 whereas the first regeneration does not increase the capacity as much as shutting down, the regenerations have been found to be cumulative. Thus the capacity following each regeneration is better than that following the regeneration before it.

Equivalent results are obtained with carbon modified with about 10 percent, as metal, cobalt and iron (CoO and FeO). Thus a capacity of 300,000 standard cubic feet of gas per cubic foot of carbon were obtained for cobalt by the invention. This compares with 60,000 cubic feet per cubic foot of carbon when no water is present. An adsorbent carbon devoid of metal oxides had a capacity of 20,000 liters per liter of carbon compared with 60,000 when the carbon contained 30 percent water. The gas in each instance was a 90 percent methane 10 percent hydrogen stream containing 100 p.p.m. hydrogen sulfide.

This invention thus provides an excellent method for improving the adsorption capacities of activated carbons. As has been shown the water can be included at any stage of use, and it can be added without having to shut down the unit in order to cool it. Given the foregoing illustrations other modifications will occur to one skilled in the art. Such modifications are deemed to be within the scope of this invention.

What is claimed is:

1. In the process for removing sulfur compounds from industrial gas streams by adsorption by passing the gas stream through a bed containing an activated carbon adsorbent the improvement for increasing the adsorption capacity of the activated carbon adsorbent for mercaptans, disulfides, thioethers, thiophenes and hydrogen sulfide present in gas streams which comprises introducing onto the porous surfaces of the adsorbent a quantity of water vapor such that the carbon adsorbent as the desulfurization commences contains at least 3 weight precent and not over 30 weight percent water based on the adsorbent, the adsorbent being selected from the group consisting of activated carbon modified by a metal selected from the group consisting of copper, iron, manganese, nickel, cobalt, cadmium, and zinc.

2. The process of claim 1 wherein the activated carbon is modified with zinc oxide.

3. The process of claim 1 wherein the activated carbon is modified with copper oxide.

4. The process of claim 1 wherein the activated carbon is modified with iron oxide.

5. The process of claim 1 wherein the water vapor is introduced onto the carbon by condensing steam thereon during regeneration.

6. The process of claim 1 wherein the water vapor is introduced onto the activated carbon prior to its initial use.

7. In the process for removing sulfur compounds from industrial gas streams by absorption by passing the gas stream through a bed containing activated carbon as an absorbent the improvement for increasing the absorption capacity of the activated carbon adsorbent for mercaptans, disulfides, thioethers, thiophenes and hydrogen sulfide present in gas streams which comprises introducing into the porous surfaces of the absorbent carbon a quantity of water vapor such that the absorbent carbon as the desulfurization commences contains at least 3 weight percent and not over 60 weight percent water based on the absorbent.

8. The process of claim 7 wherein the water vapor is introduced onto the adsorbent during regeneration.

9. The process of claim 7 wherein the sulfur containing gas is natural gas.

10. The process of claim 7 wherein the gas stream is passed through the carbon bed in several stages, water being added between stages.

References Cited

UNITED STATES PATENTS

| 2,551,905 | 5/1951 | Robinson | 23—2.1 |
| 3,199,946 | 8/1965 | Fujita et al. | 23—3.1 |

SAMIH N. ZAHARNA, *Primary Examiner.*

CHARLES N. HART, *Assistant Examiner.*

U.S. Cl. X.R.

55—74; 23—2